(12) United States Patent
Wu et al.

(10) Patent No.: US 12,332,181 B2
(45) Date of Patent: Jun. 17, 2025

(54) DUAL LENS INSPECTION DEVICE

(71) Applicant: SUN YANG OPTICS DEVELOPMENT CO., LTD., Taoyuan (TW)

(72) Inventors: Sheng Che Wu, Taoyuan (TW); Sheng Da Jiang, Taoyuan (TW); Yu Hung Chou, Taoyuan (TW)

(73) Assignee: SUN YANG OPTICS DEVELOPMENT CO., LTD., Taoyuan (TW)

( * ) Notice: Subject to any disclaimer, the term of this patent is extended or adjusted under 35 U.S.C. 154(b) by 153 days.

(21) Appl. No.: 18/447,366

(22) Filed: Aug. 10, 2023

(65) Prior Publication Data

US 2025/0052690 A1    Feb. 13, 2025

(51) Int. Cl.
| | |
|---|---|
| *G01N 21/88* | (2006.01) |
| *G01N 21/95* | (2006.01) |
| *G02B 9/60* | (2006.01) |
| *G02B 9/64* | (2006.01) |

(52) U.S. Cl.
CPC ........... *G01N 21/8806* (2013.01); *G02B 9/60* (2013.01); *G02B 9/64* (2013.01); *G01N 2021/8822* (2013.01); *G01N 2021/8835* (2013.01); *G01N 21/9501* (2013.01); *G01N 2201/0636* (2013.01); *G01N 2201/0668* (2013.01)

(58) Field of Classification Search
CPC ........... G01N 21/8806; G01N 21/9501; G01N 2021/8822; G01N 2021/8835; G01N 2201/0636; G01N 2201/0668; G02B 9/60; G02B 9/64
USPC ........................................... 356/237.1–237.5
See application file for complete search history.

(56) References Cited

U.S. PATENT DOCUMENTS

| | | | | |
|---|---|---|---|---|
| 7,554,655 | B2* | 6/2009 | Fairley | G01N 21/9501 356/237.4 |
| 7,709,815 | B2* | 5/2010 | Jager | G03F 7/70291 359/227 |

* cited by examiner

*Primary Examiner* — Seung C Sohn
(74) *Attorney, Agent, or Firm* — Birch, Stewart, Kolasch & Birch, LLP

(57) ABSTRACT

A dual lens inspection device, having a low power lens group satisfies the condition value of 3.0≥magnification≥1.0; a high power lens group, satisfies the condition value of 25.0≥magnification≥15.0; a light source module projecting an illumination light source to the low power lens group and the high power lens group; a beam splitter arranged on the optical path of the illumination light source, so as to generate a first optical path passing through the low power lens group and a second optical path passing through the high power lens group, and projected on an object located on the same plane; a first luminous flux module and a second luminous flux module control the luminous flux of the first and second optical path, and then achieve the effect of dark field illumination; a camera using the beam splitter to achieve a beam steering effect, and then captures the image of the object.

14 Claims, 7 Drawing Sheets

DUAL LENS INSPECTION DEVICE

BACKGROUND OF THE INVENTION

1. Field of the Invention

The present invention relates to an inspection device, especially one that uses a low power lens group for rough positioning, matches with a high power lens group for precise detection, and configures an internal coaxial light as illumination to achieve a dual lens inspection device with small body and high-precision optical path system.

2. Description of the Related Art

In semiconductor manufacturing, since photolithography technology allows a greater number of parts to be packed into a smaller area of the wafer; therefore, hidden defects in the wafer are usually in the sub-micron range. Also, semiconductor wafers must having inspection to detect defects, such as surface particles, blemishes, undulations, or other irregularities; since such defects can affect the final performance of semiconductor wafers, it is critical to eliminate or remove defective semiconductor wafers during the semiconductor wafer manufacturing process.

The application of the magnification of optical lenses to inspect the defect status of wafers has been used for many years, and even the use of dual lenses with high and low magnifications for inspection of wafer defects has become the mainstream; however, the current dual lens devices are very large in size, and there is no luminous flux module to control the amount of light entering, so it is impossible to achieve dark-field illumination composed of internal coaxial light, which makes the stray light serious in image capture, and the contrast is reduced, which leads to insufficient accuracy of defect inspection.

SUMMARY OF THE INVENTION

A primary objective of the present invention is to provide a dual lens inspection device with a magnification difference of up to 12 times, and use the low power lens group to inspect a large area and locate the defect position, then use the high power lens group to perform precise inspection of the position.

Another objective of the present invention is to provide a dual lens inspection device that using a luminous flux module to control the opening and closing of the optical path and the type of illumination. At the same time, the luminous flux module can be used to achieve dark field illumination composed of inner coaxial light, thereby improving the quality of image capture.

Another objective of the present invention is to provide a dual lens inspection device that using the beam splitter to achieve the beam steering of the optical path, and make the low power lens group, the high power lens group and the light source module share the optical path, and then achieve a kind of double lens inspection device with small volume and high-precision optical path system.

To achieve the objects mentioned above, the present invention includes: a body; a low power lens group, a high power lens group, a light source module, a beam splitter, a first luminous flux module, a second luminous flux module and a camera; wherein, the low power lens group arranged on one side of the inner edge of the body, and the low power lens group has a plurality of lenses to satisfy the condition value of $3.0 \geq magnification \geq 1.0$; the high power lens group arranged on the inner edge of the body and adjacent to the side of the low power lens group, and the high power lens group has a plurality of lenses to satisfy the condition value of $25.0 \geq magnification \geq 15.0$; the light source module arranged on the outer edge of the body, and projecting an illumination light source to the low power lens group and the high power lens group; the beam splitter, arranged on the inner edge of the body and on the optical path of the illumination light source, so as to generate a first optical path passing through the low power lens group and a second optical path passing through the high power lens group, and the first optical path and the second optical path are projected on an object located on the same plane; the first luminous flux module, arranged between the low power lens group and the beam splitter, and is located on the first optical path; the second luminous flux module, arranged between the high power lens group and the beam splitter, and is located on the second optical path, and the first luminous flux module and second luminous flux module are used to control the luminous flux of the first optical path and the second optical path, and then achieve the effect of dark field illumination; the camera, arranged on the outer edge of the body and adjacent to the side of the light source module, the camera uses the beam splitter to achieve a beam steering effect between the first optical path and the second optical path, and then captures the image of the object.

Whereby the low power lens group will mark the detection point of the object, and then move the device so that the high power lens group can accurately inspect the detection point of the object, so as to achieve small-volume high-precision detection results.

Moreover, the present invention further includes a first reflecting mirror arranged between the beam splitter and the camera, and is located on the first optical path and the second optical path.

Moreover, the present invention further includes a third luminous flux module, arranged between the light source module and the beam splitter, and is located on the optical path of the illumination light source, so as to control the luminous flux of the beam splitter projected by the illumination light source, and then achieve the effect of dark field illumination.

Moreover, there are five lens elements in the low power lens group, which are a first lens, a second lens, a third lens, a fourth lens and a fifth lens from the object side to the image side in sequence, and their diopters are positive, negative, positive, negative, positive, and a first light diaphragm is placed behind the fifth lens, so as to make the aperture of the low power lens group≥8 and distance between image and object between 125~165 nm. And there are nine lens elements in the high power lens group, which are a sixth lens, a seventh lens, an eighth lens, a ninth lens, a tenth lens, a eleventh lens, a twelfth lens, a thirteenth lens and a fourteenth lens from the object side to the image side in sequence, and their diopters are positive, negative, positive, positive, negative, positive, negative, positive, negative, and a second light diaphragm is placed between the eighth lens and the ninth lens, so as to make the aperture of the high power lens group≥15 and distance between image and object between 90~130 nm.

Moreover, the present invention further includes a second reflecting mirror, which is arranged between the first lens and the second lens and is located on the first optical path.

Moreover, the low power lens group can be equipped with a ring light source to provide dark field lighting with different effects.

With the features above mentioned, the present invention has effects listed below:

1. The low power lens group of the present invention has a magnification rate of 1.5 times, and the high power lens group has a magnification rate of 18 times. Since the magnification difference of the dual lens group is 12 times, the low power lens group can be used to inspect a large area and locate the defect position, and then use the high power lens group to perform precise inspection of the position.

2. Using the first, second and third luminous flux modules to control the opening and closing of the optical path and the type of illumination. At the same time, the luminous flux modules can be used to achieve dark field illumination composed of inner coaxial light, thereby improving the quality of image capture.

3. Using the beam splitter to achieve the beam steering of the optical path, and make the low power lens group, the high power lens group and the light source module share the optical path, and then achieve a kind of double lens inspection device with small volume and high-precision optical path system.

DETAILED DESCRIPTION OF THE PREFERRED EMBODIMENT

Figure 1:
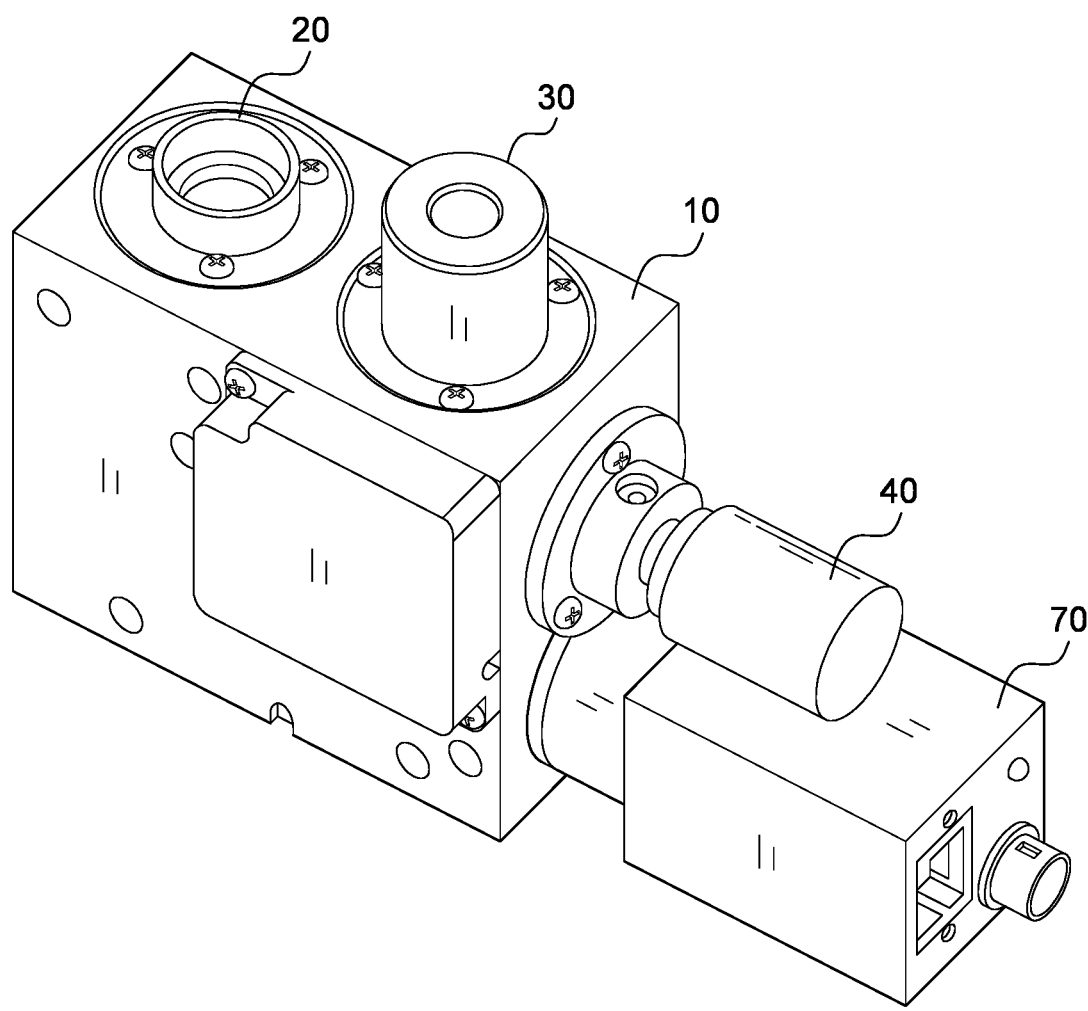
FIG. 1 is a prospective view of a dual lens inspection device of the present invention.
Figure 2:
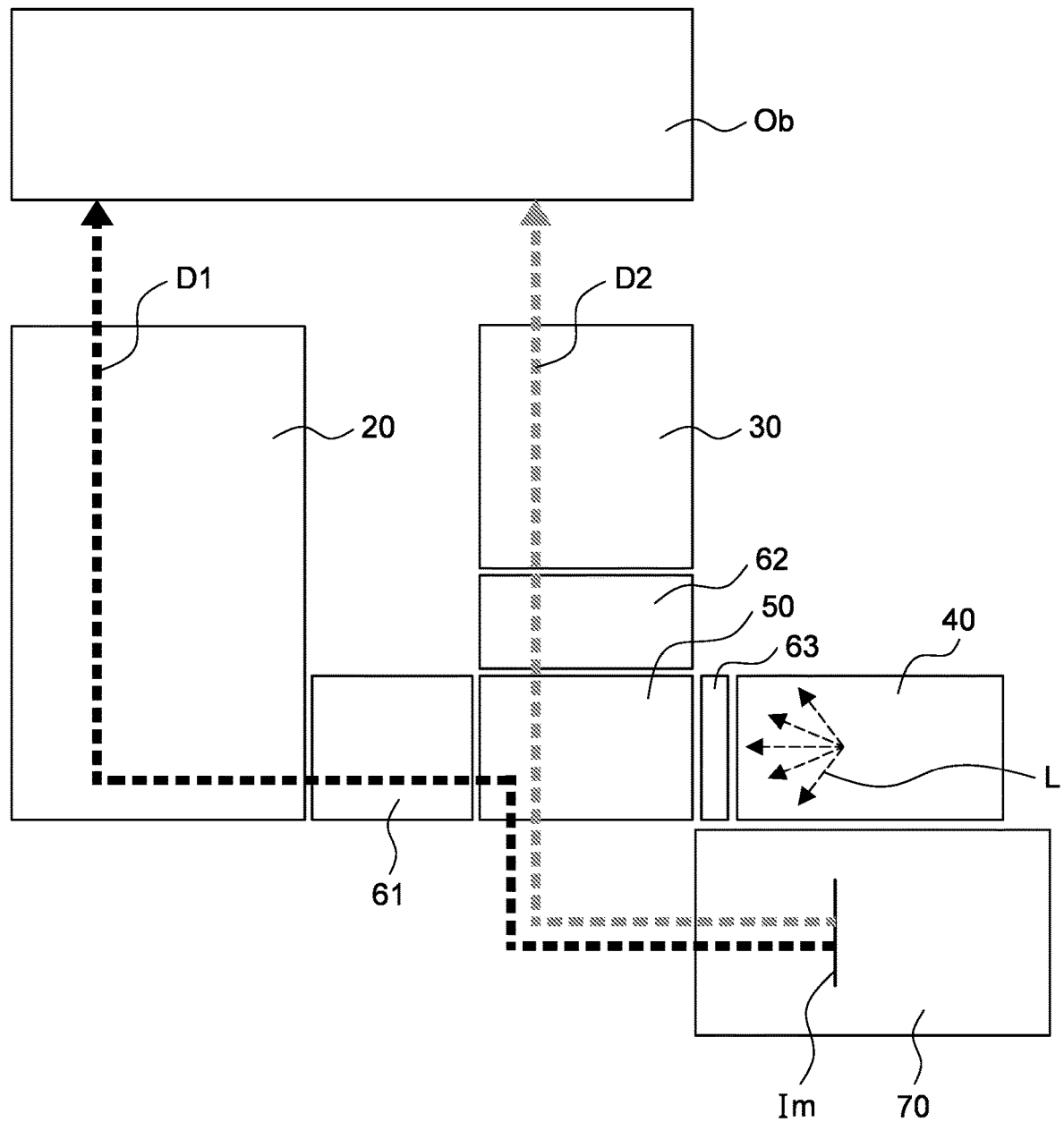
FIG. 2 is a schematic diagram illustrating optical units arrangement of the dual lens inspection device of the present invention.
Figure 3:
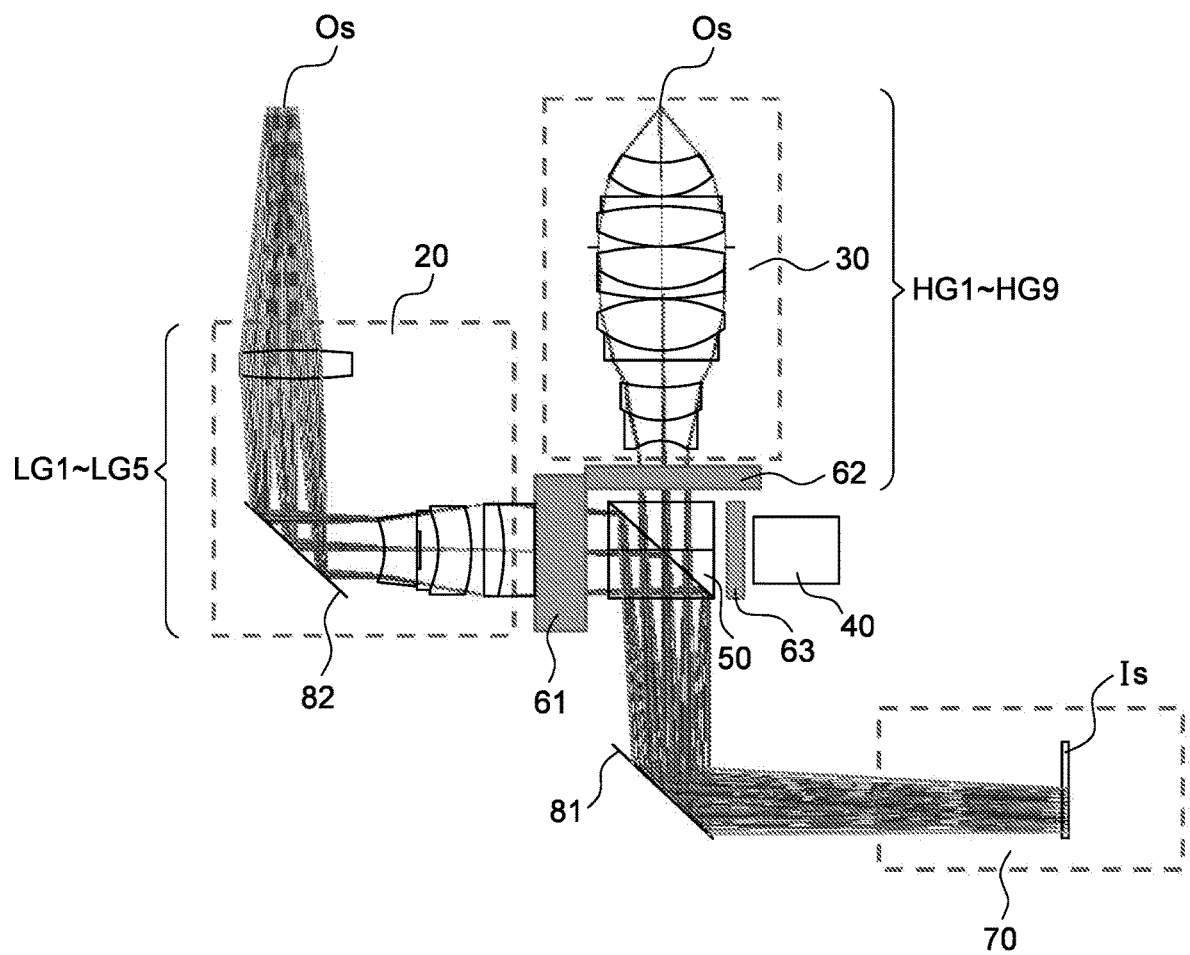
FIG. 3 is a schematic diagram illustrating the optical path of the dual lens inspection device of the present invention.

Referring to FIGS. 1~3, the present invention including: dual lens inspection device 100, comprising: a body 10; a low power lens group 20, a high power lens group 30, a light source module 40, a beam splitter 50, a first luminous flux module 61, a second luminous flux module 62, a third luminous flux module 63 and a camera 70; wherein the body 10 is used to accommodate the required optical components; wherein the low power lens group 20 arranged on one side of the inner edge of the body 10, and the low power lens group 20 has 5 lenses LG1~LG5 to satisfy the condition value of 3.0≥magnification≥1.0; the high power lens group 30 arranged on the inner edge of the body 10 and adjacent to the side of the low power lens group 20, and the high power lens group 30 has 9 lenses HG1~HG9 to satisfy the condition value of 25.0≥magnification≥15.0; the light source module 40, arranged on the outer edge of the body 10, and projecting an illumination light source L to the low power lens group 20 and the high power lens group 30; the beam splitter 50, arranged on the inner edge of the body 10 and on the optical path of the illumination light source L, so as to generate a first optical path D1 passing through the low power lens group 20 and a second optical path D2 passing through the high power lens group 30, and the first optical path D1 and the second optical path D2 are projected on an object Ob located on the same plane; the first luminous flux module 61, arranged between the low power lens group 20 and the beam splitter 50, and is located on the first optical path D1; the second luminous flux module 62, arranged between the high power lens group 30 and the beam splitter 50, and is located on the second optical path D2, and the first luminous flux module 61 and second luminous flux module 62 are used to control the luminous flux of the first optical path D1 and the second optical path D2, and then achieve the effect of dark field illumination; the third luminous flux module 63, arranged between the light source module 40 and the beam splitter 50, and is located on the optical path of the illumination light source L, so as to control the luminous flux of the beam splitter 50 projected by the illumination light source L, and then achieve the effect of dark field illumination; the camera 70, arranged on the outer edge of the body 10 and adjacent to the side of the light source module 40, and having a first reflecting mirror 81 arranged between the beam splitter 50 and the camera 70, and is located on the first optical path D1 and the second optical path D2, letting the camera 70 able to use the beam splitter 50 to achieve a beam steering effect between the first optical path D1 and the second optical path D2, and then captures the image Im of the object Ob.

Figure 4A:
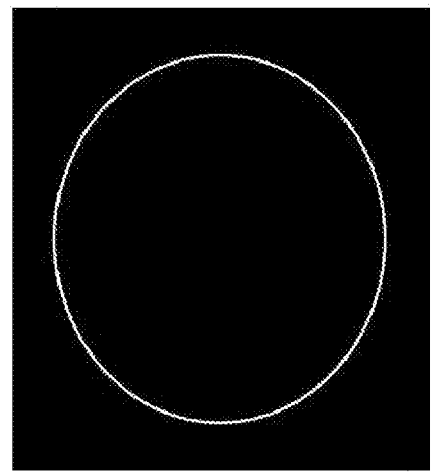
FIG. 4A is a schematic diagram illustrating the luminous flux module of the present invention in closing type.
Figure 4B:
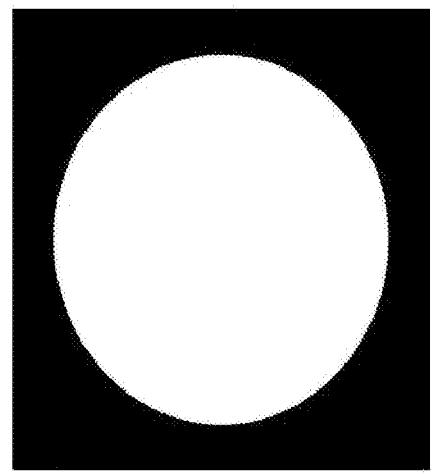
FIG. 4B is a schematic diagram illustrating the luminous flux module of the present invention in opening type.
Figure 4C:
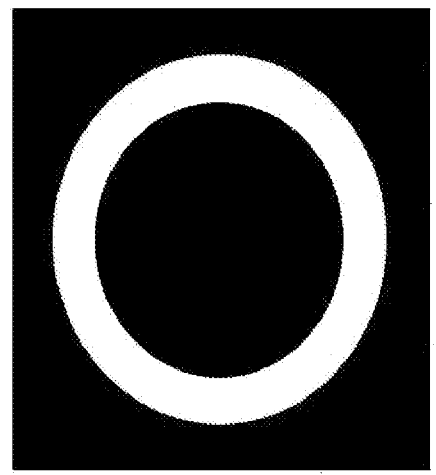
FIG. 4C is a schematic diagram illustrating the luminous flux module of the present invention in special type.
Figure 5:
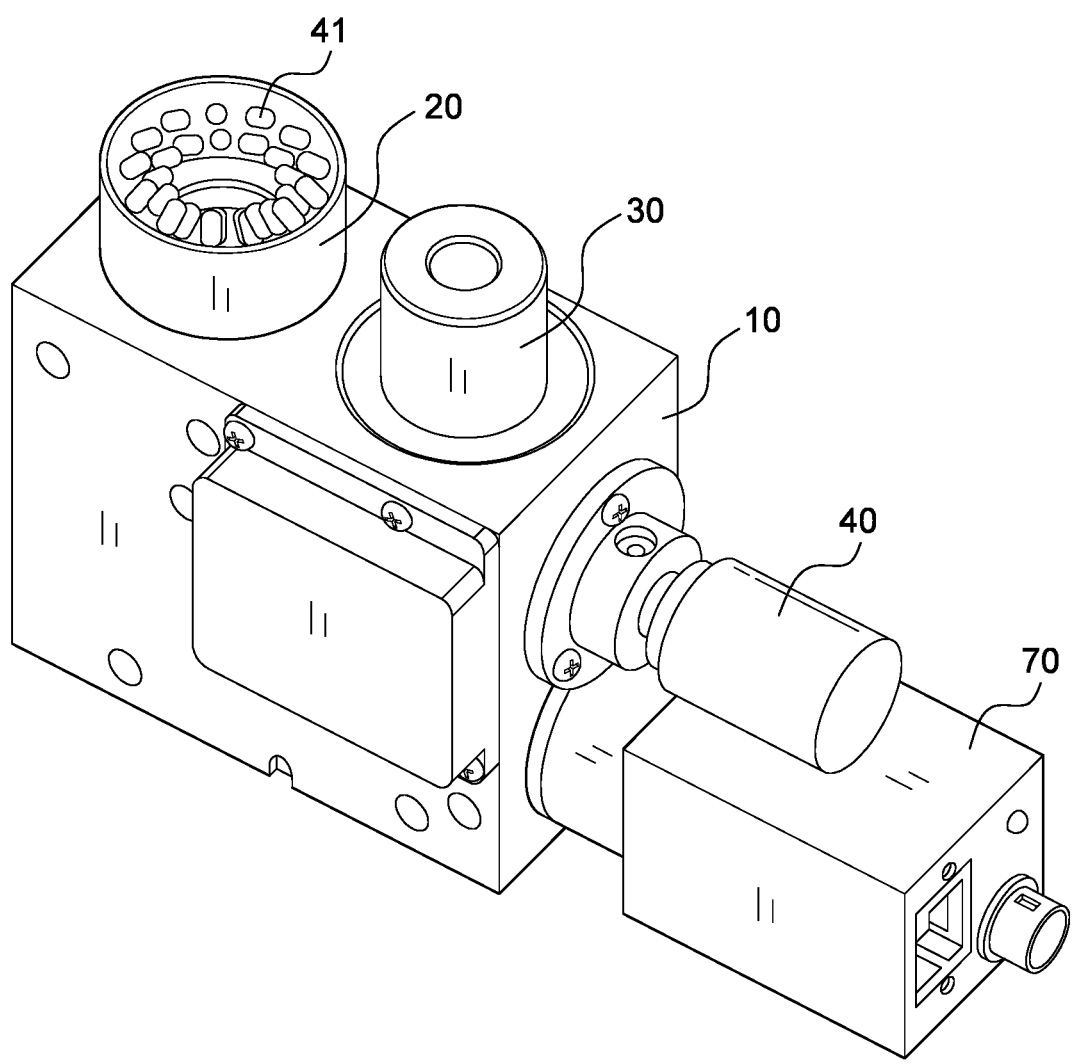
FIG. 5 is a prospective view of a dual lens inspection device of another embodiment of the present invention.

In the light source module 40 mentioned above, the illumination light source L is visible light, which can be the R/G/B monochromatic light of the LED, and can also be the white light of the LED, but it is not limited thereto; Also, the beam splitter 50 can be a cube beam splitter and can also be a plate beam splitter, but it is not limited thereto; Moreover, the luminous flux module of the present invention includes the first luminous flux module 61, the second luminous flux module 62, the third luminous flux module 63 mentioned above, and its structure is a masking type light control mechanism; and the purpose of setting the luminous flux module is to control the amount of incoming light and change the light distribution pattern, including a fully closing type as shown in FIG. 4A, a fully opening type as shown in FIG. 4B, and a special-shaped opening type as shown in FIG. 4C; therefore, the present invention arranges a third luminous flux module 63 between the light source module 40 and the beam splitter 50, so as to control the luminous flux of the beam splitter 50 projected by the illumination light source L; and arranging a first luminous flux module 61 and a second luminous flux module 62 behind the beam splitter 50, so as to control the luminous flux of the first optical path D1 and the second optical path D2; In other words, the first luminous flux module 61 and the second luminous flux module 62 the third luminous flux module 63 are able to make the dual lens inspection device of the present invention achieve dark field illumination. Moreover, in another embodiment, as shown in FIG. 5, the low power lens group 20 can be equipped with a ring light source 41 to provide dark field lighting with different effects.

Figure 6:
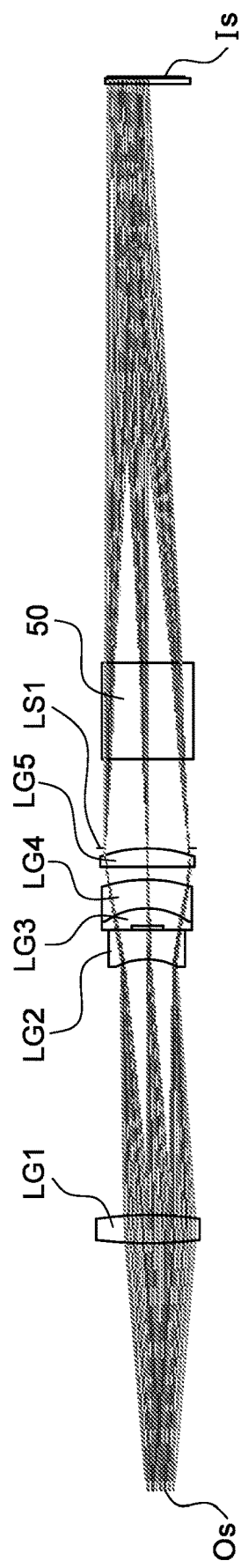
FIG. 6 is a schematic diagram illustrating the lens structure of the low power lens group of the present invention.

Referring to FIG. 6, the low power lens group 20 has five lens elements, which are a first lens LG1, a second lens LG2, a third lens LG3, a fourth lens LG4 and a fifth lens LG5 from the object side Os to the image side Is in sequence, and their diopters are positive, negative, positive, negative, positive, and a first light diaphragm LS1 is placed behind the fifth lens LG5, so as to make the low power lens group 20 has the magnification rate reach 1.5 times, the aperture≥8 and distance between image and object between 125~165 nm. In order to reduce the volume of the device, a second reflecting mirror 82 is further used in the present invention, which is arranged between the first lens LG1 and the second lens LG2, and is located on the first optical path D1, referring to FIG. 3; Parameter values such as radius and thickness of each lens of the low power lens group 20 of the present invention are listed in the Table 1.

TABLE 1

| Lens | Radius | Thickness |
|---|---|---|
| LG1 | 40.16 | 3.000 |
|  | −40.16 | 26.237 |
| LG2 | −8.68 | 3.000 |
|  | infinity | 0.315 |
| LG3 | −34.82 | 1.917 |
| LG4 | −9.40 | 3.000 |
|  | −16.89 | 1.313 |
| LG5 | infinity | 1.788 |
|  | −20.07 | 0.100 |
| LS1 | infinity | 9.066 |
| 50 | infinity | 10 |
|  | infinity | 59.455 |
| CG | infinity | 0.500 |
|  | infinity | 0.045 |

Figure 7:
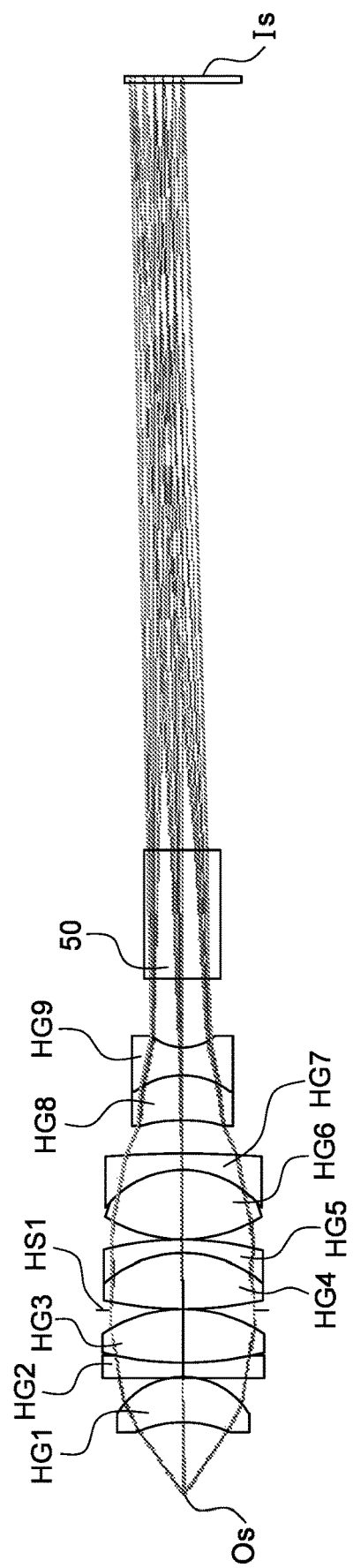
FIG. 7 is a schematic diagram illustrating the lens structure of the high power lens group of the present invention.

Referring to FIG. 7, the high power lens group 30 has nine lens elements, which are a sixth lens HG1, a seventh lens HG2, an eighth lens HG3, a ninth lens HG4, a tenth lens HG5, a eleventh lens HG6, a twelfth lens HG7, a thirteenth lens HG8 and a fourteenth lens HG9 from the object side OS to the image side Is in sequence, and their diopters are positive, negative, positive, positive, negative, positive, negative, positive, negative, and a second light diaphragm HS2 is placed between the eighth lens HG3 and the ninth lens HG4, so as to make the high power lens group 30 has the magnification rate reach 18 times, the aperture≥15 and distance between image and object between 90~130 nm. Parameter values such as radius and thickness of each lens of the high power lens group 30 of the present invention are listed in the Table 2.

TABLE 2

| Lens | Radius | Thickness |
|---|---|---|
| HG1 | −11.84 | 3.516 |
|  | −6.88 | 0.100 |
| HG2 | −98.60 | 1.000 |
| HG3 | 28.94 | 4.061 |
|  | −13.38 | 0.100 |
| HS2 | infinity | 0.100 |
| HG4 | 34.99 | 4.260 |
| HG5 | −11.04 | 1.000 |
|  | −32.89 | 0.100 |
| HG6 | 13.59 | 5.353 |
| HG7 | −8.82 | 1.218 |
|  | −86.97 | 2.611 |
| HG8 | −17.70 | 3.500 |
| HG9 | −7.14 | 2.094 |
|  | 4.60 | 5.317 |
| 50 | infinity | 10 |
|  | infinity | 59.455 |
| CG | infinity | 0.500 |
|  | infinity | 0.045 |

The low power lens group 20 of the present invention has a magnification rate of 1.5 times, and the high power lens group 30 has a magnification rate of 18 times. Since the magnification difference of the dual lens group is 12 times, the low power lens group 20 can be used to inspect a large area and locate the defect position, and then use the high power lens group 30 to perform precise inspection of the position. Moreover, the present invention using the first, second and third luminous flux modules 61, 62, 63 to control the opening and closing of the illumination light source L, the first optical path D1, the second optical path D2 and the type of illumination. At the same time, the first, second and third luminous flux modules 61, 62, 63 can be used to achieve dark field illumination composed of inner coaxial light, thereby improving the quality of image capture. Moreover, the present invention using the beam splitter 50, the first reflecting mirror 81 and the second reflecting mirror 82 to achieve the beam steering of the optical path, and make the low power lens group 20, the high power lens group 30 and the light source module 40 share the optical path, and then achieve a kind of double lens inspection device with small volume and high-precision optical path system.

What is claimed is:

1. A dual lens inspection device, comprising:
a body;
a low power lens group, arranged on one side of the inner edge of the body, and the low power lens group has a plurality of lenses to satisfy the condition value of 3.0≥magnification≥1.0;
a high power lens group, arranged on the inner edge of the body and adjacent to the side of the low power lens group, and the high power lens group has a plurality of lenses to satisfy the condition value of 25.0≥magnification≥15.0;
a light source module, arranged on the outer edge of the body, and projecting an illumination light source to the low power lens group and the high power lens group;
a beam splitter, arranged on the inner edge of the body and on the optical path of the illumination light source, so as to generate a first optical path passing through the low power lens group and a second optical path passing through the high power lens group, and the first optical path and the second optical path are projected on an object located on the same plane;
a first luminous flux module, arranged between the low power lens group and the beam splitter, and is located on the first optical path; a second luminous flux module, arranged between the high power lens group and the beam splitter, and is located on the second optical path, and the first luminous flux module and second luminous flux module are used to control the luminous flux of the first optical path and the second optical path, and then achieve the effect of dark field illumination;
a camera, arranged on the outer edge of the body and adjacent to the side of the light source module, the camera uses the beam splitter to achieve a beam steering effect between the first optical path and the second optical path, and then captures the image of the object;
whereby the low power lens group will mark the detection point of the object, and then move the device so that the high power lens group can accurately inspect the detection point of the object, so as to achieve small-volume high-precision detection results.

2. The dual lens inspection device as claimed in claim 1, wherein further includes a first reflecting mirror arranged between the beam splitter and the camera, and is located on the first optical path and the second optical path.

3. The dual lens inspection device as claimed in claim 1, wherein there are five lens elements in the low power lens group, which are a first lens, a second lens, a third lens, a fourth lens and a fifth lens from the object side to the image side in sequence, and their diopters are positive, negative, positive, negative, positive, and a first light diaphragm is placed behind the fifth lens, so as to make the aperture of the low power lens group≥8 and distance between image and object between 125~165 nm.

4. The dual lens inspection device as claimed in claim 1, wherein there are nine lens elements in the high power lens group, which are a sixth lens, a seventh lens, an eighth lens, a ninth lens, a tenth lens, a eleventh lens, a twelfth lens, a thirteenth lens and a fourteenth lens from the object side to the image side in sequence, and their diopters are positive, negative, positive, positive, negative, positive, negative, positive, negative, and a second light diaphragm is placed between the eighth lens and the ninth lens, so as to make the aperture of the high power lens group≥15 and distance between image and object between 90~130 nm.

5. The dual lens inspection device as claimed in claim 1, wherein the beam splitter has an adjustable mechanism, and through an appropriate amount of translation and rotation, the first optical path and the second optical path can have a position alignment effect.

6. The dual lens inspection device as claimed in claim 3, wherein further includes a second reflecting mirror, which is arranged between the first lens and the second lens and is located on the first optical path.

7. The dual lens inspection device as claimed in claim 3, wherein the low power lens group can be equipped with a ring light source to provide dark field lighting with different effects.

8. A dual lens inspection device, comprising:
a body;
a low power lens group, arranged on one side of the inner edge of the body, and the low power lens group has a plurality of lenses to satisfy the condition value of 3.0≥magnification≥1.0;
a high power lens group, arranged on the inner edge of the body and adjacent to the side of the low power lens group, and the high power lens group has a plurality of lenses to satisfy the condition value of 25.0≥magnification≥15.0;
a light source module, arranged on the outer edge of the body, and projecting an illumination light source to the low power lens group and the high power lens group;
a beam splitter, arranged on the inner edge of the body and on the optical path of the illumination light source, so as to generate a first optical path passing through the low power lens group and a second optical path passing through the high power lens group, and the first optical path and the second optical path are projected on an object located on the same plane;
a first luminous flux module, arranged between the low power lens group and the beam splitter, and is located on the first optical path; a second luminous flux module, arranged between the high power lens group and the beam splitter, and is located on the second optical path, and the first luminous flux module and second luminous flux module are used to control the luminous flux of the first optical path and the second optical path, and then achieve the effect of dark field illumination; a third luminous flux module, arranged between the light source module and the beam splitter, and is located on the optical path of the illumination light source, so as to control the luminous flux of the beam splitter projected by the illumination light source, and then achieve the effect of dark field illumination;
a camera, arranged on the outer edge of the body and adjacent to the side of the light source module, the camera uses the beam splitter to achieve a beam steering effect between the first optical path and the second optical path, and then captures the image of the object;
whereby the low power lens group will mark the detection point of the object, and then move the device so that the high power lens group can accurately inspect the detection point of the object, so as to achieve small-volume high-precision detection results.

9. The dual lens inspection device as claimed in claim 8, wherein further includes a first reflecting mirror arranged between the beam splitter and the camera, and is located on the first optical path and the second optical path.

10. The dual lens inspection device as claimed in claim 8, wherein there are five lens elements in the low power lens group, which are a first lens, a second lens, a third lens, a fourth lens and a fifth lens from the object side to the image side in sequence, and their diopters are positive, negative, positive, negative, positive, and a first light diaphragm is placed behind the fifth lens, so as to make the aperture of the low power lens group≥8 and distance between image and object between 125~165 nm.

11. The dual lens inspection device as claimed in claim 8, wherein there are nine lens elements in the high power lens group, which are a sixth lens, a seventh lens, an eighth lens, a ninth lens, a tenth lens, a eleventh lens, a twelfth lens, a thirteenth lens and a fourteenth lens from the object side to the image side in sequence, and their diopters are positive, negative, positive, positive, negative, positive, negative, positive, negative, and a second light diaphragm is placed between the eighth lens and the ninth lens, so as to make the aperture of the high power lens group≥15 and distance between image and object between 90~130 nm.

12. The dual lens inspection device as claimed in claim 8, wherein the beam splitter has an adjustable mechanism, and through an appropriate amount of translation and rotation, the first optical path and the second optical path can have a position alignment effect.

13. The dual lens inspection device as claimed in claim 10, wherein further includes a second reflecting mirror, which is arranged between the first lens and the second lens and is located on the first optical path.

14. The dual lens inspection device as claimed in claim 10, wherein the low power lens group can be equipped with a ring light source to provide dark field lighting with different effects.

* * * * *